(12) United States Patent
Matsushita

(10) Patent No.: US 10,203,048 B2
(45) Date of Patent: Feb. 12, 2019

(54) AUTOMATIC DRAIN DISCHARGE APPARATUS

(71) Applicant: SMC CORPORATION, Chiyoda-ku (JP)

(72) Inventor: Kazuhiro Matsushita, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/664,428

(22) Filed: Jul. 31, 2017

(65) Prior Publication Data

US 2018/0045326 A1    Feb. 15, 2018

(30) Foreign Application Priority Data

Aug. 9, 2016   (JP) ................. 2016-156421

(51) Int. Cl.
| | |
|---|---|
| *F16K 31/34* | (2006.01) |
| *F16T 1/20* | (2006.01) |
| *F16T 1/14* | (2006.01) |
| *F16T 1/24* | (2006.01) |
| *F16T 1/38* | (2006.01) |

(52) U.S. Cl.
CPC ............... *F16K 31/34* (2013.01); *F16T 1/14* (2013.01); *F16T 1/24* (2013.01); *F16T 1/386* (2013.01); *F16T 1/20* (2013.01); *Y10T 137/308* (2015.04); *Y10T 137/3068* (2015.04)

(58) Field of Classification Search
CPC ............... F16K 31/34; Y10T 137/3003; Y10T 137/3021; Y10T 137/3052; Y10T 137/3068; Y10T 137/3077; Y10T 137/308; Y10T 137/7365; Y10T 137/7368; Y10T 137/7371; Y10T 137/7378; Y10T 137/7381; Y10T 137/7423; Y10T 137/7426; F16T 1/00; F16T 1/20; F16T 1/38; F16T 1/14; F16T 1/24; F16T 1/386
USPC ....... 137/171, 177, 187, 192, 195, 196, 411, 137/412, 413, 415, 416, 429, 430; 96/409, 412
See application file for complete search history.

(56) References Cited

U.S. PATENT DOCUMENTS 2,726,732 A * 12/1955 Wilson, Jr. ............... F16T 1/20
                                                    137/195
2,744,534 A *  5/1956 Wilson, Jr. ............. B01D 45/08
                                                    137/195

(Continued)

FOREIGN PATENT DOCUMENTS

JP          2007-16877         1/2007

*Primary Examiner* — Craig J Price
(74) *Attorney, Agent, or Firm* — Oblon, McClelland, Maier & Neustadt, L.L.P.

(57) ABSTRACT

An automatic drain discharge utilizing a vertically movable float to activate a diaphragm of a pilot valve to drive a drain plug. The inner diameter at the bottom of a case is gradually decreased from upper to lower positions. A bottom surface of a communication hole of a drain housing provided in an opening of the case has an inclined surface inclined toward a drain discharge hole. An outer marginal portion which is positioned at the uppermost position in the bottom surface of the communication hole is in the same plane as or lower than a marginal portion which is positioned at the lowermost position in an inner circumferential surface of the case and adjacent to the opening.

5 Claims, 6 Drawing Sheets

(56) References Cited

U.S. PATENT DOCUMENTS

| | | | | |
|---|---|---|---|---|
| 3,275,020 | A * | 9/1966 | Fujiwara | B01D 45/12 137/195 |
| 3,318,323 | A * | 5/1967 | White | F16T 1/20 137/195 |
| 3,418,789 | A * | 12/1968 | Hoffman | F16T 1/22 137/195 |
| 3,507,098 | A * | 4/1970 | Veres | F16T 1/14 137/194 |
| 3,980,457 | A * | 9/1976 | Smith | B01D 46/0031 137/195 |
| 3,993,090 | A * | 11/1976 | Hankison | F16T 1/20 137/195 |
| 4,112,968 | A * | 9/1978 | Hoffman | F16T 1/20 137/195 |
| 4,136,009 | A * | 1/1979 | Samiran | B01D 17/0214 210/114 |
| 5,121,767 | A * | 6/1992 | Chuang | F04B 39/16 137/195 |
| 5,122,167 | A * | 6/1992 | Daniels | B01D 39/16 137/195 |
| 5,595,210 | A * | 1/1997 | Kushiya | F16K 31/34 137/181 |
| 5,983,919 | A * | 11/1999 | Ottinger | F16T 1/20 137/195 |
| 6,287,370 | B1 * | 9/2001 | Kanazawa | F16T 1/20 137/181 |
| 2007/0006918 | A1 | 1/2007 | Yamamoto | |
| 2017/0016573 | A1 * | 1/2017 | Doki | F16T 1/22 |

* cited by examiner

AUTOMATIC DRAIN DISCHARGE APPARATUS

CROSS-REFERENCE TO RELATED APPLICATION

This application is based upon and claims the benefit of priority from Japanese Patent Application No. 2016-156421 filed on Aug. 9, 2016, the contents of which are incorporated herein by reference.

BACKGROUND OF THE INVENTION

Field of the Invention

The present invention relates to an automatic drain discharge apparatus.

Description of the Related Art

In conventional known automatic drain discharge apparatuses, drain discharged from various fluid pressure devices such as a compressor, an after cooler, etc. in a fluid pressure circuit is stored temporarily. Each time a certain quantity of the drain is stored, the drain is discharged to the outside automatically.

For example, Japanese Laid-Open Patent Publication No. 2007-016877 discloses an automatic drain discharge apparatus 1 shown in FIG. 6.

The automatic drain discharge apparatus 1 includes a case 2 for temporarily storing drain 11, a housing 4 provided in an opening 3 at the bottom of the case 2, a spool type drain valve plug 6 for opening/closing a drain discharge hole 5 provided in the housing 4, a piston 7 attached to the drain valve plug 6, a cylinder 8 containing the piston 7, a float 9 provided outside the cylinder 8, and a pilot valve mechanism 10 for driving the drain valve plug 6 by applying pilot pressure to the piston 7.

Droplets of drains dripped from an opening formed at an upper position of the case 2 are accommodated at the bottom of the case 2. When the float 9 moves up by the increase in the liquid level of the accumulated drain 11, a lever 12 coupled to the float 9 moves pivotally. By the pivotal movement of the lever 12, a pilot valve 13 moves upward. Consequently, the pilot valve 13 moves away from a pilot valve seat 14, and pressurized fluid flows into a pilot chamber 15. Under operation of the pressurized fluid, the piston 7 and the drain valve plug 6 attached to the piston 7 are pushed down. Therefore, the drain valve plug 6 moves away from a drain valve seat 16. As a result, the drain 11 in the case 2 is discharged from the drain discharge hole 5.

SUMMARY OF THE INVENTION

The drain discharged from the fluid pressure devices such as a compressor contains foreign substances in the solid state or in the form of mud, as well as fluid. For example, the foreign substances include dust included in the pressurized fluid, rust in tubes used in fluid pressure devices, etc.

In this regard, in the automatic drain discharge apparatus 1 described in Japanese Laid-Open Patent Publication No. 2007-016877, the drain 11 moves into the opening 17 provided at the lower position of the cylinder 8 toward the drain valve plug 6. However, since the upper end of the housing 4 is positioned above the bottom the case 2, the foreign substances contained in the drain 11 are retained (stagnant) at the bottom (liquid reservoir part) of the case 2 undesirably.

Such foreign substances may cause problems in the discharging operation of the drain 11. Therefore, preferably, the foreign substances should be discharged to the outside of the case 2 rapidly together with the drain 11.

The present invention has been made taking the above problem into account, and an object of the present invention is to provide an automatic drain discharge apparatus which is capable of reliably and rapidly discharging foreign substances contained in the drain to the outside to prevent problems caused by stagnant foreign substances, and which is operated stably for a long period of time.

An automatic drain discharge apparatus according to the present invention includes a case including an opening at a bottom of the case, a first housing provided in the opening, and including a drain discharge hole, a drain valve seat provided in the drain discharge hole, a drain valve plug configured to open/close the drain valve seat, a float movable vertically in accordance with a liquid level of drain in the case, and a pilot valve configured to apply pilot pressure to a diaphragm by vertical movement of the float in order to drive the drain valve plug. An inner diameter at the bottom of the case is gradually decreased from upper to lower positions. The first housing includes a communication hole configured to allow an inside of the case to communicate with the drain discharge hole. A bottom surface of the communication hole includes an inclined surface inclined toward the drain discharge hole. The bottom surface of the communication hole and an inner circumferential surface of the case form a continuous surface, or an uppermost position in the bottom surface of the communication hole is lower than a lowermost position in the inner circumferential surface of the case and adjacent to the opening.

In the structure, a curved surface and an inclined surface extending continuously toward the drain discharge hole are formed at the bottom of the case. Therefore, it is possible to discharge the foreign substances reliably and rapidly, and prevent problems resulting from stagnation of the foreign substances.

Further, preferably, the drain valve plug may be a poppet type valve plug which is configured to open/close the drain valve seat from below.

In the structure, in respect of opening/closing of the drain valve seat and driving of the drain valve plug by the pilot pressure, the poppet type drain valve plug does not include any portions which slide on other members. Thus, biting of the foreign substances in the sliding parts does not occur, and it is possible to eliminate the problems resulting from the foreign substances beforehand.

Further, preferably, a second housing may be provided above the first housing, the first housing may be configured to contain the drain valve plug, the drain valve seat, and the diaphragm, and the second housing may include a base fitted to an upper portion of the first housing, and a cylindrical guide provided at a center of an upper surface the base in a manner that the cylindrical guide is inserted into the float, and the float may be positioned above the base of the second housing.

In the structure, after the liquid level of the drain exceeds the position of the base of the second housing, the float starts to be displaced upward. Therefore, it is possible to increase the quantity of drain that can be stored inside the case. Thus, it is possible to increase the quantity of drain discharge per one drain discharge operation. Since it is possible to sweep away the foreign substances using a larger quantity of drain, it becomes possible to reliably discharge the foreign substances.

Moreover, preferably, the pilot valve may include a seat provided at an upper end of the cylindrical guide, a pilot valve plug configured to open/close the seat, and a lever coupled to the pilot valve plug, the float may include a flange part at an upper end of a marginal portion of the float, the flange part having a diameter expanded in a radial direction, and when the float is displaced upward in accordance with an increased liquid level of the drain, the flange part may push up the lever to open the seat.

In the structure, in comparison with the conventional float which does not have the flange part, it is possible to increase the distance from the pivot point (fulcrum) of the lever to the point of action of the buoyant force of the float. Therefore, it is possible to obtain the lever force necessary for pivotal movement of the lever, while retaining the small outer size of the float as a whole. Further, it becomes possible to increase the quantity of drain stored in the gap between the outer circumferential surface of the float and the inner circumferential surface of the case.

In the invention, the curved surface and the inclined surface are formed at the bottom of the case, and the curved surface and the inclined surface extend continuously toward the drain discharge hole. In the structure, it is possible to reliably and rapidly discharge foreign substances contained in the drain to the outside to prevent problems caused by the stagnant foreign substances. As a result, the automatic drain discharge apparatus can be operated stably for a long period of time.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, preferred embodiments of an automatic drain discharge apparatus 20 according to the present invention will be described in detail with reference to the accompanying drawings.

Figure 1:
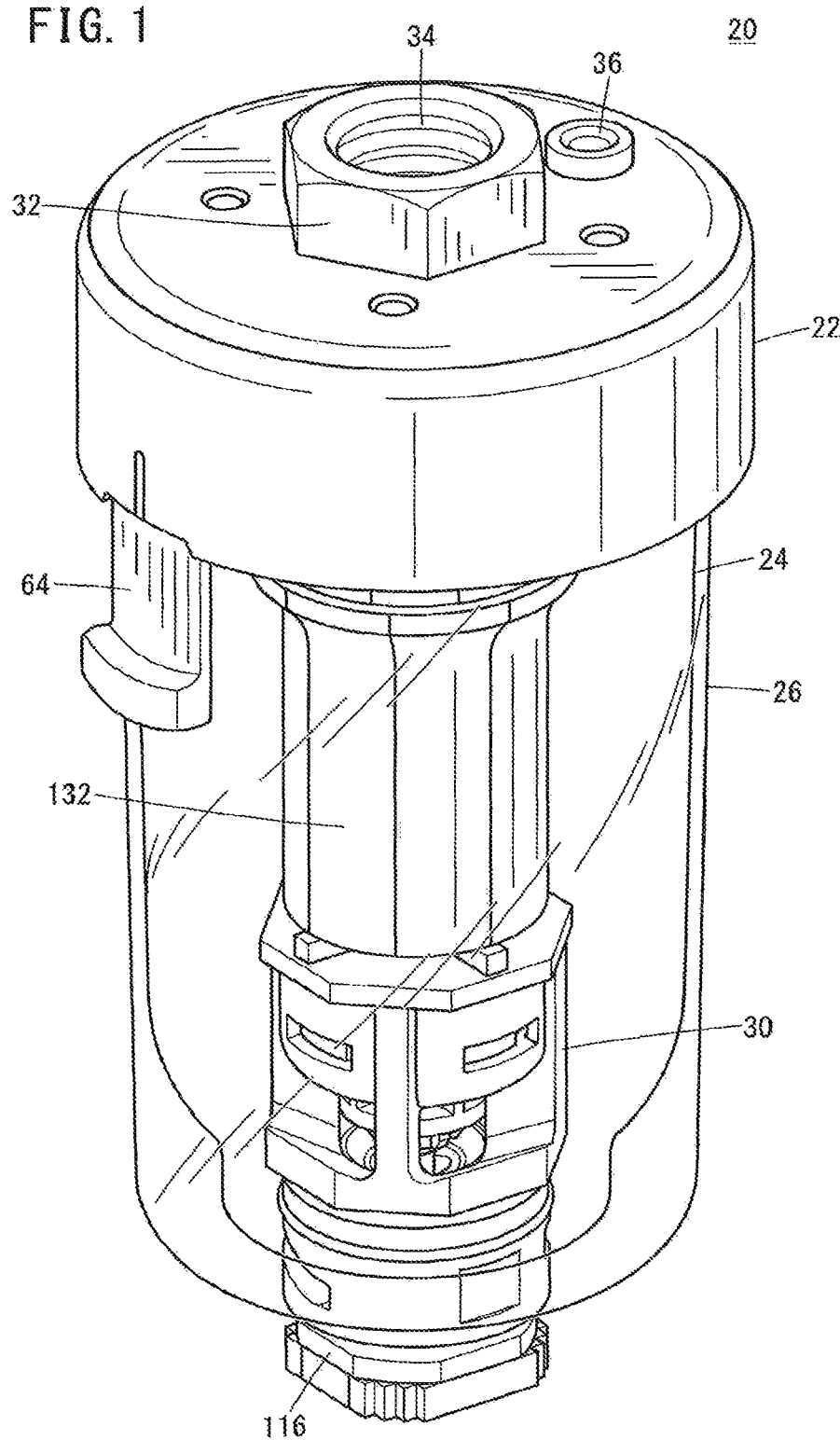
FIG. 1 is a perspective view schematically showing structure of an automatic drain discharge apparatus according to an embodiment of the present invention.
Figure 2:
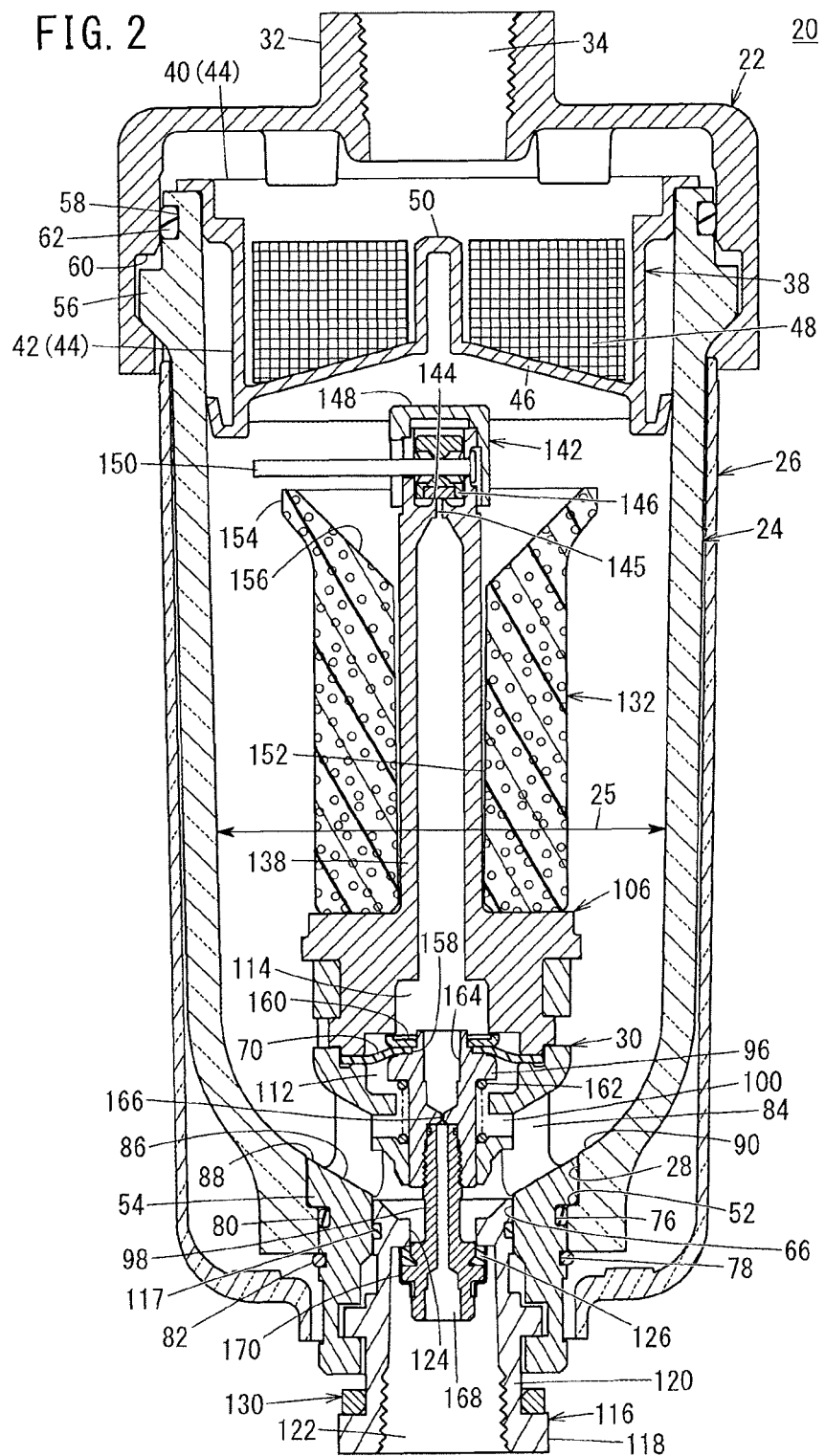
FIG. 2 is a vertical cross sectional view of an automatic drain discharge apparatus shown in FIG. 1.

As shown in FIGS. 1 and 2, the automatic drain discharge apparatus 20 includes a lid member 22, a cylindrical case 24 having a bottom attached to a lower position of the lid member 22 in a liquid tight manner, and a case guide 26 provided around the case 24 for protection of the case 24. An opening 28 is defined at the bottom of the case 24, and a drain housing (first housing) 30 is provided in the opening 28. Members (described later) related to the automatic discharge function are assembled together to form the drain housing 30.

The lid member 22 is opened on the lower side, and a female screw portion 32 is provided at the center of an upper portion of the lid member 22. The female screw portion 32 protrudes upward in the figures. An opening extending through the core of the female screw portion 32 is used as a drain inlet hole 34. A bleed valve attachment hole 36 having a small diameter is provided adjacent to the female screw portion 32.

A bleed valve (not shown) for discharging pressurized fluid in the case 24 to the outside is attached to the lid member 22 using the bleed valve attachment hole 36. When the pressurized fluid in the case 24 is discharged from the bleed valve to the outside, the internal pressure in the case 24 is decreased to produce a differential pressure, and generate a flow in the pressurized fluid. Even in the case where drain does not flow into the case 24 easily, e.g., in the case where drain tubes are narrow and long and/or the drain inlet hole 34 is small, by the flow of the pressurized fluid generated by the bleed valve, the drain smoothly flows into the case 24. Further, small holes positioned symmetrically about the drain inlet hole 34 are bracket attachment holes for attaching the automatic drain discharge apparatus 20 to a wall surface (not shown), etc.

As shown in FIG. 2, the case 24 is fitted to a lower portion of the lid member 22. An element (filter element) 38 is attached to an opening at an upper end of the case 24. This element 38 is made up of a support frame 44, and a substantially conical bottom plate 46 formed integrally with a lower portion of the support frame 44. The support frame 44 includes an annular bearing 40, and an annular wall 42 extending downward from the bearing 40. An annular mesh filter body 48 is provided inside the support frame 44. A substantially cylindrical hollow projection 50 at the center of the bottom plate 46 is a finger grip which is picked by a user to pull up the element 38 at the time of removing the element 38 from the case 24, e.g., to disassemble the components for cleaning.

The upper end of the annular wall 42 of the support frame 44 is folded in stages outward in the radial direction, and the flange part of the annular wall 42 is held by the case 24. The lower end of the annular wall 42 is folded upward, and the outer surface of the annular wall 42 contacts the inner surface of the case 24. In this manner, the element 38 is fixed to the case 24.

As described above, the case 24 has a substantially cylindrical shape opened on the upper side. The case 24 is made of transparent material such as synthetic resin. The inner diameter 25 at the bottom of the case 24 is gradually decreased from the upper to lower positions. A substantially octagonal opening 28 is defined at the center of the bottom of the case 24 using the thick portion of the case 24. A step 52 is provided at an inner marginal portion of the opening 28, at a position slightly lower than the inner circumferential surface of the case 24. A flange part 54 of the drain housing 30 described later is seated on the step 52.

A plurality of engagement projections 56 and a circumferential groove 58 are provided in the circumferential side surface of the case 24, adjacent to the end of the opening formed on the upper side. The engagement projections 56 protrude outward in the radial direction, and the circumferential groove 58 is formed around the outer circumferential surface of the case 24. Each of the engagement projections 56 engages with an engagement recess 60 formed in the inner wall of the lid member 22. In the structure, the case 24 is detachably attached to the lid member 22. An O-ring 62 is provided in the circumferential groove 58 to keep the liquid tightness or the air tightness between the case 24 and the lid member 22.

The case guard 26 surrounds the case 24, and protects the case 24. The case guard 26 has a substantially cylindrical shape, as with the case 24, and is made of transparent material such as synthetic resin. The case guard 26 is detachably fixed to the lid member 22 through a lock button 64 shown in FIG. 1.

Figure 3:
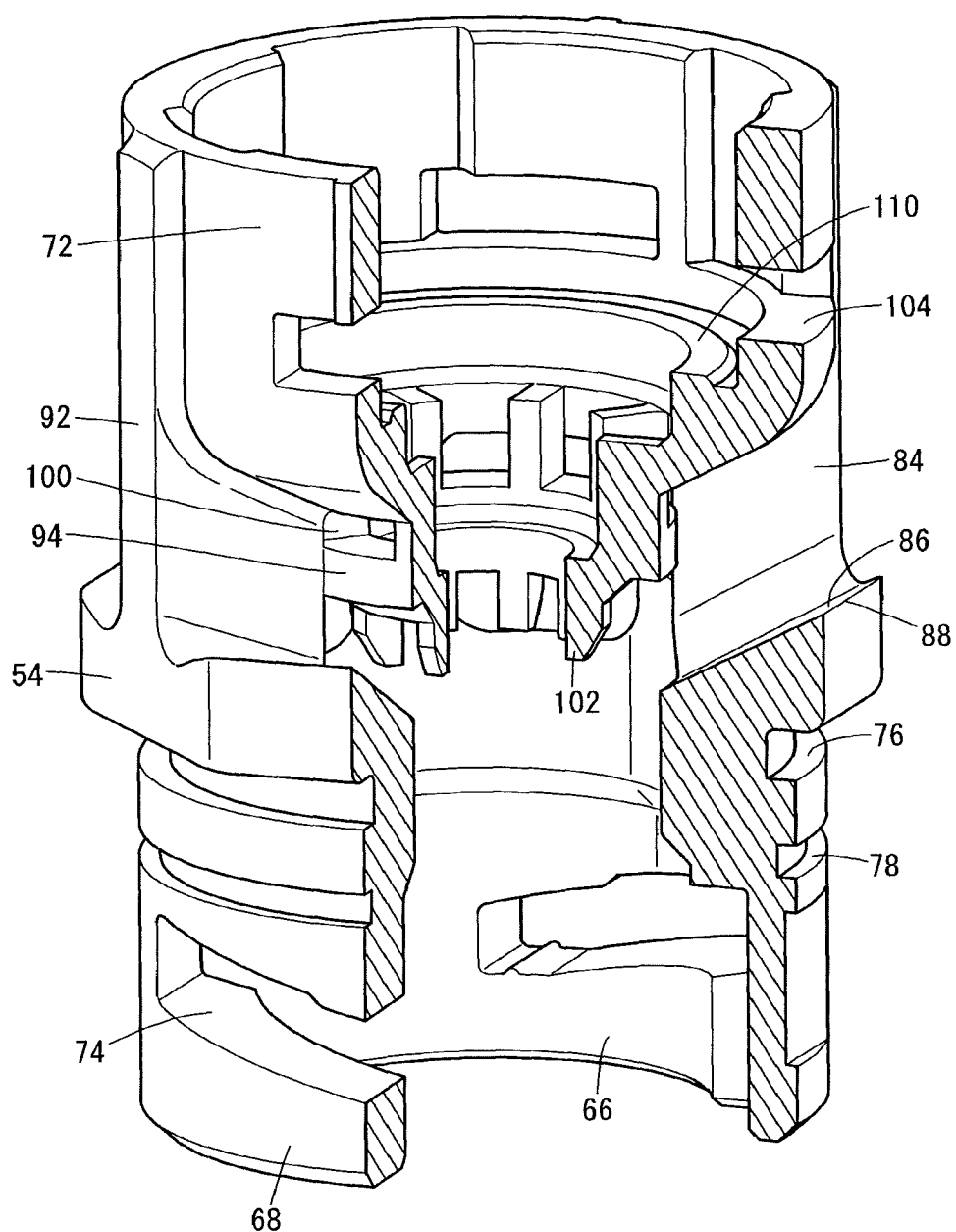
FIG. 3 is a cross sectional view of a drain housing of the automatic drain discharge apparatus shown in FIG. 1.
Figure 4:
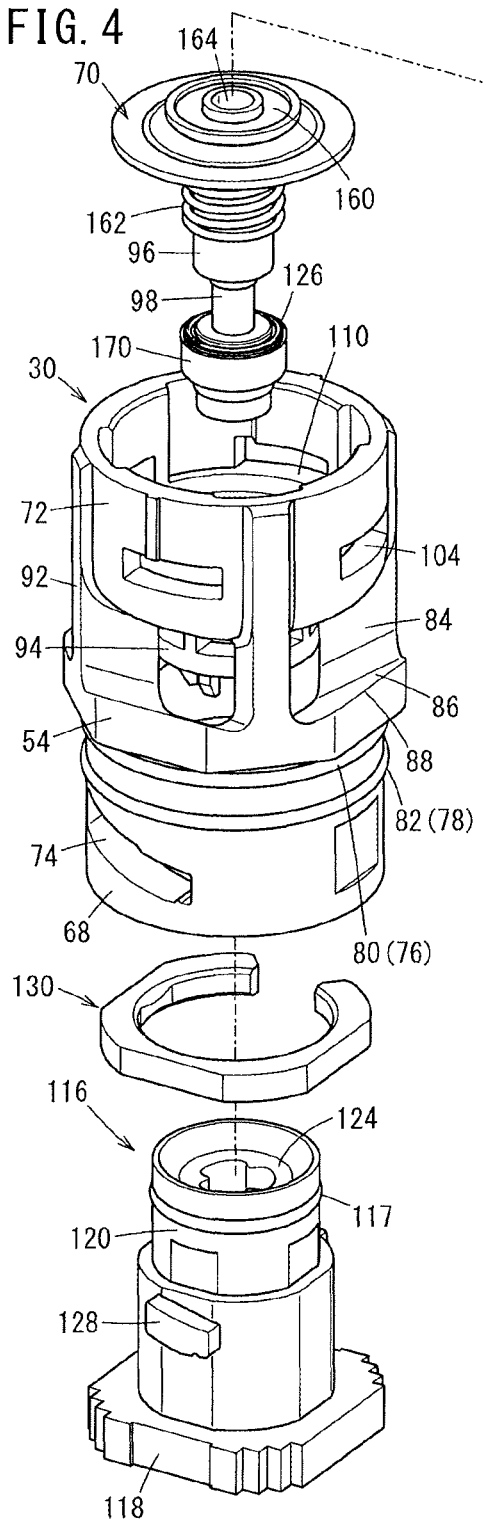
FIG. 4 is a partial exploded perspective view showing main components of the automatic drain discharge apparatus shown in FIG. 1.
Figure 4:
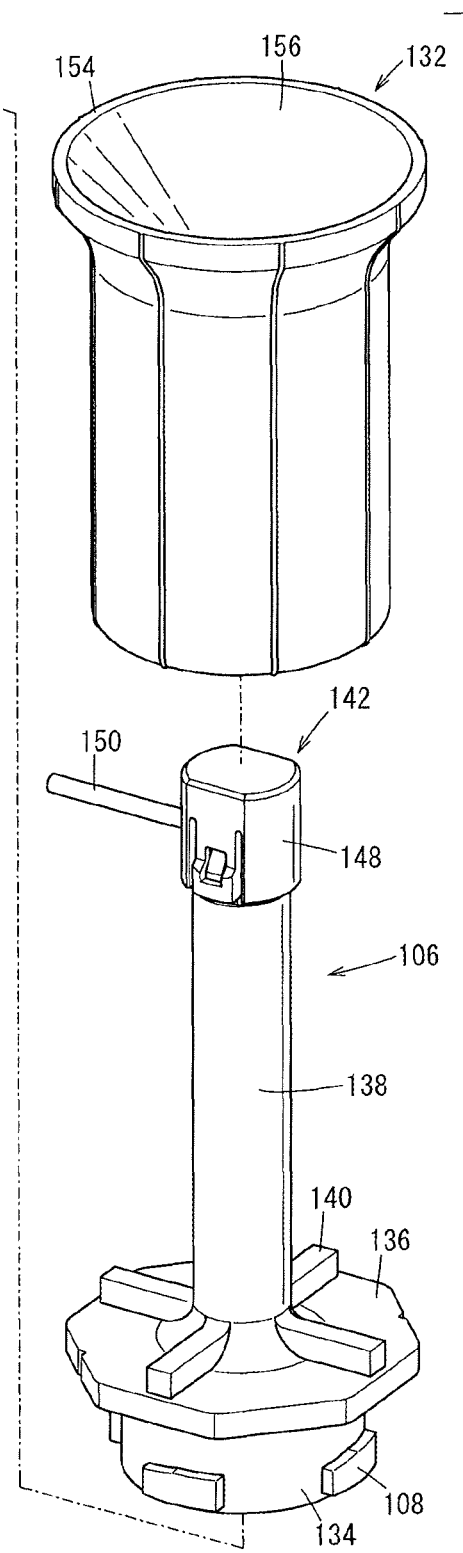

As shown in FIGS. 3 and 4, the drain housing 30 has a substantially cylindrical shape as a whole, and the drain housing 30 is opened at the upper end and the lower end. The drain housing 30 includes a drain discharge part 68, the flange part 54, and a pressure receiving part 72. A drain discharge hole 66 is formed inside the drain discharge part 68. The flange part 54 is provided above the drain discharge part 68, and protrudes outward from the circumferential side surface of the drain housing 30 in the radial direction. The pressure receiving part 72 is provided above the flange part 54, and a diaphragm (pressure receiving element) 70 described later is placed in the pressure receiving part 72.

The drain discharge hole 66 is formed inside the drain discharge part 68 as a passage for discharging the drain. An engagement hole 74 is formed in the circumferential wall of the drain discharge part 68. The engagement hole 74 is inclined, and opened in the circumferential direction. A circumferential groove 76 and a circumferential groove 78 are formed coaxially on the circumferential surface of the drain discharge part 68 above the engagement hole 74. The circumferential groove 76 and circumferential groove 78 are spaced from each other by a predetermined distance. An O-ring 80 is provided in the circumferential groove 76, and a stopper ring 82 is provided in the circumferential groove 78 (see FIG. 2) to keep the liquid tightness between the drain housing 30 and the case 24.

The flange part 54 is provided above the drain discharge part 68. The outer shape of the flange part 54 is a substantially octagonal shape, corresponding to the shape of the step 52 provided in the opening 28 at the bottom of the case 24. The flange part 54 is seated on the step 52 to provide the drain housing 30 for the case 24.

Four communication holes 84 are provided above the flange part 54, between the flange part 54 and the pressure receiving part 72 in the circumferential direction. The inside of the case 24 and the drain discharge hole 66 are communicated through the communication holes 84.

As shown in FIG. 2, a bottom surface (upper surface of the flange part 54) 86 of the communication holes 84 is in the form of an inclined surface inclined toward the drain discharge hole 66. An outer marginal portion 88 which is positioned at the uppermost position in the bottom surface 86 of the communication hole 84 (outer marginal portion 88 which is positioned at the uppermost position of the flange part 54) is in the same plane as a marginal portion 90 which is positioned at the lowermost position in the inner circumferential surface of the case 24 and adjacent to the opening 28. That is, the inner circumferential surface (curved surface) of the bottom of the case 24 and the bottom surface 86 (inclined surface) of the communication hole 84 of the drain housing 30 form an even smooth continuous surface.

Four walls 92 between the four communication holes 84 function as partitions between the communication holes 84, and function as coupling parts for coupling the flange part 54 and the pressure receiving part 72 integrally.

A small cylindrical portion 94 having a small diameter protrudes from the inside of the four communication holes 84. The small cylindrical portion 94 is oriented toward the drain discharge hole 66 from a position below the pressure receiving part 72. A diaphragm holder 96 described later and a stem 98 coupled to the diaphragm holder 96 are inserted into the small cylindrical portion 94 in the axial direction. A plurality of small communication holes 100 are opened in the circumferential wall of the small cylindrical portion 94. A plurality of projections 102 oriented to the drain discharge hole 66 are formed below the small cylindrical portion 94. The projections 102 are spaced from one another at predetermined intervals in an annular pattern.

The pressure receiving part 72 has a substantially cylindrical shape opened on the upper side. A plurality of laterally rectangular engagement holes 104 are formed in the circumferential side surface of the pressure receiving part 72. An engagement projection 108 of a float holder member 106 (second housing) described later engages with the engagement hole 104.

A step 110 is provided in the inner circumferential surface of the pressure receiving part 72, at a position shifted downward in the axial direction from the opening end by a predetermined distance. The diaphragm 70 is placed on the step 110. The outer marginal portion of the diaphragm 70 is fixedly held between the step 110 and a lower end of the float holder member 106 described later. At this time, a diaphragm chamber 112 is formed on the lower side of the diaphragm 70 and a pilot chamber 114 is formed on the upper side of the diaphragm 70. The drain or the pressurized fluid flows into the diaphragm chamber 112 through the small communication holes 100, and the pressurized fluid flows into the pilot chamber 114.

A substantially cylindrical drain guide 116 is assembled to a lower portion of the drain discharge part 68 of the drain housing 30 in a liquid tight manner using an O-ring 117. The drain guide 116 includes a flat handle part 118 and a cylindrical part 120 protruding upward from the handle part 118. A drain channel 122 is formed inside the cylindrical part 120 for guiding the drain. The inner diameter of the drain channel 122 is reduced on the inner circumferential side of the cylindrical part 120, adjacent to the end of the opening on the upper side. The portion having the small diameter functions as a drain valve seat 124. A drain valve plug 126 described later can be seated on the drain valve seat 124 from below.

As shown in FIG. 4, a substantially rectangular small projection 128 protrudes from the outer circumferential surface of the cylindrical part 120 of the drain guide 116. By rotating the handle part 118 to insert the cylindrical part 120 into the drain discharge part 68, the small projection 128 of the drain guide 116 is brought into engagement with the engagement hole 74 of the drain discharge part 68. Further, a spacer ring 130 is fitted to the root of the cylindrical part 120.

The float holder member 106 is fitted to an upper part of the drain housing 30. A float 132 described later is loosely fitted to, and held by the float holder member 106. The float 132 is displaceable vertically. The float holder member 106 includes a short cylindrical portion (base) 134, a substantially octagonal flat plate portion 136, and a cylindrical guide 138. The short cylindrical portion 134 has substantially the same diameter as the drain housing 30, and has an opening on the lower side. The flat plate portion 136 is provided on an upper surface of the short cylindrical portion 134. The cylindrical guide 138 is in the form of a projection having a small diameter provided at the center of the flat plate portion 136.

The plurality of engagement projections 108 are arranged in the circumferential direction, on the circumferential side surface of the short cylindrical portion 134. The short cylindrical portion 134 is inserted into the pressure receiving part 72 of the drain housing 30. The engagement projections 108 of the short cylindrical portion 134 engage with engagement holes 104 of the pressure receiving part 72 to couple the drain housing 30 and the float holder member 106 together.

Blocks 140 extend on the upper surface of the flat plate portion 136 in a crisscross pattern, and a lower end surface of the float 132 contacts the blocks 140. The hollow pilot chamber 114 is formed in the axial direction, inside the short cylindrical portion 134 and the cylindrical guide 138. The diaphragm 70 is provided at the lower end of the pilot chamber 114. At an upper end of the cylindrical guide 138, a seat 144 of a pilot valve 142, a pilot valve plug 146 for opening/closing an orifice 145 of the seat 144, a cap 148 covering the seat 144 and the pilot valve plug 146, and a lever 150 coupled to the pilot valve plug 146 are provided.

The float 132 is made of material of specific gravity lower than liquid such as water, e.g., formed by deforming foaming synthetic resin into a substantially cylindrical shape having substantially the same diameter as the drain housing 30. A through hole 152 extending in the axial direction is formed at the center of the float 132. A flange part 154 is provided at an upper end of the marginal portion of the float 132. The diameter of the flange part 154 is increased in the radial direction to have a tapered shape. Using the flange part 154, an inversely conical recess 156 is provided.

The cylindrical guide 138 of the float holder member 106 is inserted into the through hole 152 of the float 132. The float 132 is held inside the case 24 in a vertically displaceable manner in accordance with the liquid level of the drain. When the float 132 is at the lowermost position, the float 132 contacts the blocks 140 provided on the upper surface of the short cylindrical portion 134. That is, in the case 24, the float 132 is provided above the short cylindrical portion 134 of the float holder member 106 all the time.

The outer marginal portion of the diaphragm 70 is held between the step 110 of the drain housing 30 and the lower end of the float holder member 106. Thus, the diaphragm 70 is fixed within the pressure receiving part 72 of the drain housing 30.

A small hole 158 is provided at the central part of the diaphragm 70. The diaphragm holder 96 has an annular protrusion on its upper surface. The annular protrusion is inserted into the small hole 158 of the diaphragm 70 from below, and protrudes above the diaphragm 70. An annular shell 160 is fitted around the annular protrusion, and the diaphragm 70 is held between the shell 160 on the upper side and the diaphragm holder 96 on the lower side.

A spring 162 is wound around the lower portion of the diaphragm holder 96 to bias the diaphragm 70 upward. A through hole 164 extends through the diaphragm holder 96 in the axial direction up to the upper end where the annular protrusion is present. An orifice 166 where the inner diameter is reduced is provided at an intermediate position of the through hole 164.

The substantially cylindrical stem 98 is screwed into the portion below the orifice 166, in the through hole 164 of the diaphragm holder 96. The stem 98 has a through hole 168 extending in the axial direction. The upper end of this through hole 168 communicates with the through hole 164 of the diaphragm holder 96, and the lower end thereof communicates with the drain channel 122 of the drain guide 116.

An expanded diameter portion 170 is provided at the lower end of the stem 98. The annular drain valve plug 126 is fitted to the portion above the expanded diameter portion 170. The drain valve plug 126 functions as a poppet type valve plug seated on the drain valve seat 124 from below.

The diaphragm chamber 112 communicates with the outside through the through hole 164 of the diaphragm holder 96, the orifice 166, the through hole 168 of the stem 98, and the drain channel 122.

The automatic drain discharge apparatus 20 according to the present invention basically has the structure as described above. Next, operation and advantages of the automatic drain discharge apparatus 20 will be described.

FIG. 2 shows a state where pressurized fluid at a constant level is supplied from the drain inlet hole 34, there is no drain in the case 24, and the float 132 is at the lowermost end position. This state will be referred to as the initial state.

In the state of FIG. 2, the float 132 is at the lowermost end position, and the lever 150 is kept horizontal. The pilot valve plug 146 is seated on the seat 144 to close the orifice 145. In the meanwhile, pressurized fluid at the same pressure as the inside of the case 24 is supplied to the diaphragm chamber 112 of the drain housing 30 through the small communication holes 100. The diaphragm 70 receives upward forces from both of the pressurized fluid and the spring 162. Therefore, the drain valve plug 126 is seated on the drain valve seat 124.

In this state, when the drain flows through the drain inlet hole 34 into the case 24, the drain is accumulated from the lowermost end position at the bottom of the case 24. The liquid level of the drain is increased gradually. At this time, the drain is gradually supplied into the diaphragm chamber 112 through the small communication holes 100, and eventually, the diaphragm chamber 112 is filled with the drain. At this time, since the pressure of the pressurized fluid is applied to the liquid surface of the drain, the upward force of the pressurized fluid is applied to the diaphragm 70 through the drain, and the upward force by the spring 162 is applied to the diaphragm 70.

Then, when the liquid surface of the drain exceeds the position of the short cylindrical portion 134 of the float holder member 106, and reaches the float 132, the float 132 receives the buoyant force, and starts to be displaced upward. By the displacement of the float 132 in the vertical direction, the flange part 154 of the float 132 is displaced upward as well, and the flange part 154 is brought into contact with the front end of the lever 150. When upward displacement of the float 132 continues, the float 132 presses the front end of the lever 150. As a result, the lever 150 moves pivotally clockwise in FIG. 2, about the proximal end position.

Figure 5:
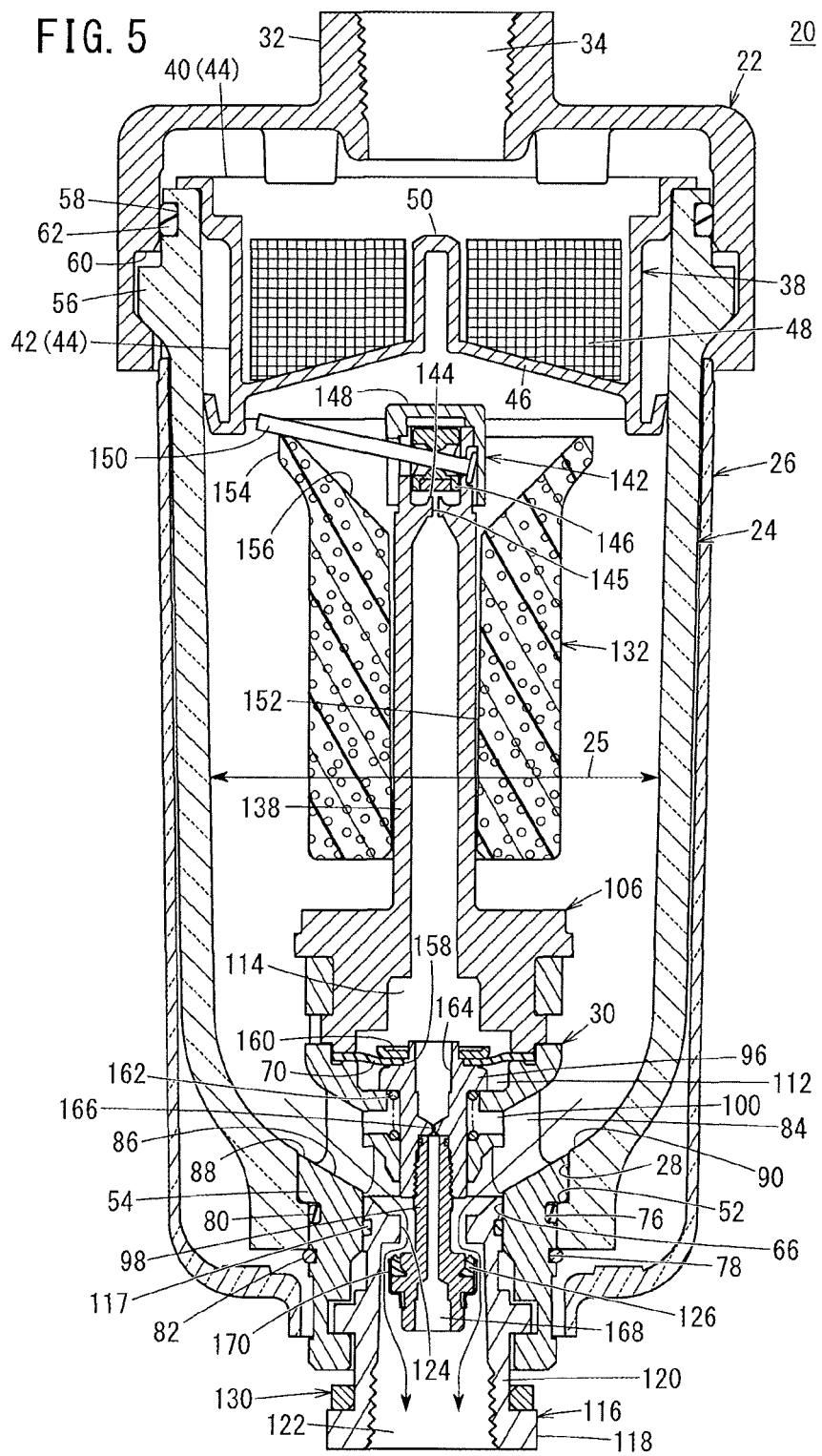
FIG. 5 is a vertical cross sectional view of the automatic drain discharge apparatus shown in FIG. 1, showing a valve opening state of a drain valve seat.
Figure 6:
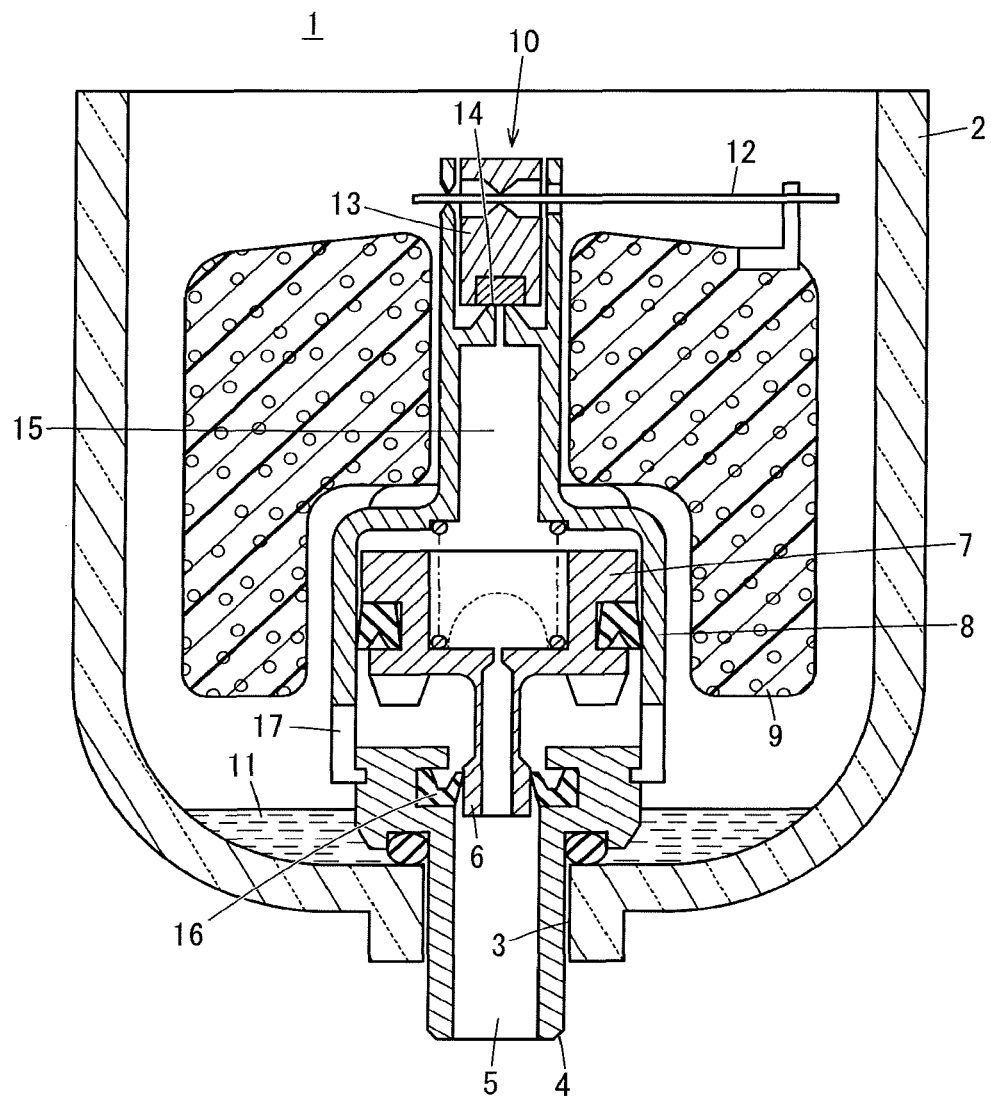
FIG. 6 is a vertical cross sectional view with partial omission, showing structure of an automatic drain discharge apparatus according to a conventional technique.

By the pivotal movement of the lever 150, the pilot valve plug 146 is spaced from the seat 144. As a result, the pressurized fluid in the case 24 flows into the pilot chamber 114 through the orifice 145 of the seat 144, and the downward pilot pressure is applied to the diaphragm 70. When the downward force of the pilot pressure applied to push down the diaphragm 70 exceeds the upward forces of the pressurized fluid in the case 24 and the spring 162 applied to push up the diaphragm 70, the diaphragm 70 is pushed down, and lowered. The stem 98 coupled to the diaphragm 70 is displaced downward, and the drain valve plug 126 is spaced from the drain valve seat 124. As a result, the drain inside the case 24 flows through the communication hole 84 and the drain discharge hole 66 of the drain housing 30, and then, the drain is discharged from the drain channel 122 to the outside of the case 24 (see FIG. 5).

When the liquid level of the drain in the case 24 is decreased by discharging the drain, the buoyant force of the float 132 is lost gradually, and the float 132 is displaced downward. As a result of downward displacement of the float 132, the lever 150 which has been brought in contact with the flange part 154 moves pivotally counterclockwise in the figures. Further, when the lower surface of the float 132 is brought into contact with the blocks 140 on the upper surface of the short cylindrical portion 134 of the float holder member 106, the downward displacement of the float 132 is finished. At this time, the lever 150 returns to the horizontal position in the initial state, and the pilot valve plug 146 closes the orifice 145 of the seat 144.

In this state, though the supply of the pressurized fluid to the pilot chamber 114 is finished, the pressurized fluid is still present in the pilot chamber 114. The pressurized fluid in the pilot chamber 114 is throttled through the orifice 166 formed in the through hole 164 of the diaphragm holder 96, and flows through the through hole 168 of the stem 98 and the drain channel 122 over considerable time. Then, the pressurized fluid is discharged to the outside of the case 24. Therefore, the diaphragm 70 is pushed down, and the state where the drain valve plug 126 is spaced from the drain valve seat 124, i.e., the state where the drain can be discharged continues for predetermined time.

Then, when all of the pressurized fluid in the pilot chamber 114 is discharged to the outside the case 24, the downward force which pushes down the diaphragm 70 is lost, and the diaphragm 70 is pushed up by the pressurized fluid in the case 24 and the spring 162. As a result, the drain valve plug 126 is displaced upward to close the drain valve seat 124, and the automatic drain discharge apparatus 20 returns to the initial state (see FIG. 2).

As described above, the automatic drain discharge apparatus 20 according to the present invention includes the case 24 having the opening 28 at the bottom of the case 24, the drain housing 30 provided in the opening 28, and having the drain discharge hole 66, the drain valve seat 124 provided in the drain discharge hole 66, the drain valve plug 126 configured to open/close the drain valve seat 124, the float 132 movable vertically in accordance with the liquid level of drain in the case 24, and the pilot valve 142 configured to apply pilot pressure to the diaphragm 70 by vertical movement of the float 132 for driving the drain valve plug 126. The inner diameter 25 at the bottom of the case 24 is gradually decreased from upper to lower positions. The drain housing 30 has the communication hole 84 configured to allow the inside of the case 24 to communicate with the drain discharge hole 66. The bottom surface 86 of the communication hole 84 has the inclined surface inclined toward the drain discharge hole 66. The bottom surface of the communication hole and an inner circumferential surface of the case form a continuous surface, or an uppermost position in the bottom surface 86 of the communication hole 84 is lower than the lowermost position in the inner circumferential surface of the case 24 and adjacent to the opening 28.

In the structure, a curved surface or an inclined surface extending continuously toward the drain discharge hole 66 is formed at the bottom of the case 24. As a result, even if the drain contains foreign substances, since the foreign substances move down smoothly, stagnation of the foreign substances does not occur. Therefore, it is possible to discharge the foreign substances reliably and rapidly, and prevent problems resulting from stagnation of the foreign substances.

Further, preferably, the drain valve plug 126 is a poppet type valve plug which is configured to open/close the drain valve seat 124 from below.

In the structure, in respect of opening/closing the drain valve seat 124 and driving the drain valve plug 126 by the pilot pressure, both of the drain valve plug 126 and the diaphragm 70 do not include any portions which slide on other members. Therefore, unlike the conventional automatic drain discharge apparatus 1 having sliding parts such as the spool type drain valve plug 6 and/or the piston 7, problems such as biting of the foreign substances in the sliding parts does not occur, and it is possible to eliminate the problems resulting from the foreign substances beforehand.

Further, in comparison with the case of using the spool type drain valve body, by adopting the poppet type drain valve plug 126, it is possible to increase the opening diameter of the drain channel 122. Since the quantity of discharging the drain per one discharging operation is increased, and the number of discharging operations of the drain can be reduced, it is possible to increase the product life of the automatic drain discharge apparatus 20.

Further, preferably, the float holder member (second housing) 106 is provided above the drain housing (first housing) 30, the drain housing 30 is configured to contain the drain valve plug 126, the drain valve seat 124, and the diaphragm 70, and the float holder member 106 includes a short cylindrical portion (base) 134 fitted to an upper portion of the drain housing 30, and the cylindrical guide 138 is provided at the center of an upper surface the short cylindrical portion 134 in a manner that the cylindrical guide 138 is inserted into the float 132, and the float 132 is positioned above the short cylindrical portion 134 of the float holder member 106.

In the structure, after the liquid level of the drain exceeds the position of the short cylindrical portion 134 of the float holder member 106, the float 132 starts to be displaced upward. Therefore, it is possible to increase the quantity of drain that can be stored inside the case 24. Thus, it is possible to increase the quantity of drain discharge per one drain discharge operation. Since it is possible to sweep away the foreign substances using a larger quantity of drain, it becomes possible to reliably discharge the foreign substances.

Moreover, preferably, the pilot valve 142 may include the seat 144 provided at an upper end of the cylindrical guide 138, the pilot valve plug 146 configured to open/close the seat 144, and the lever 150 coupled to the pilot valve plug 146, the float 132 includes the flange part 154 having a diameter expanded in a radial direction, at an upper end of a marginal portion of the float 132, and when the float 132 is displaced upward in accordance with the increased liquid level of the drain, the flange part 154 pushes up the lever 150 to open the seat 144.

In the structure, in comparison with the conventional float which does not have the flange part, it is possible to increase the distance from the pivot point (fulcrum) of the lever 150 to the point of action of the buoyant force of the float 132. In the structure, it is possible to obtain the lever force necessary for pivotal movement of the lever 150, while retaining the small outer size of the float 132 as a whole. Further, it becomes possible to increase the quantity of drain stored in the gap between the outer circumferential surface of the float 132 and the inner circumferential surface of the case 24.

Further, an engagement hole 74 opened with inclination in a circumferential direction is formed in the circumferential wall of the drain discharge part 68 of the drain housing 30.

Therefore, when the handle part 118 of the drain guide 116 is rotated, the small projection 128 of the drain guide 116 is guided by inclination of the engagement hole 74. The drain guide 116 moves back and forth in the axial direction of the drain discharge hole 66, and it is possible to move the drain valve plug 126 away from the drain valve seat 124. That is, by rotating the handle part 118, it is possible to manually discharge the drain in the case 24.

The embodiment for carrying out the above invention has been described in connection with the case where the outer marginal portion 88 which is positioned at the uppermost position in the bottom surface 86 of the communication hole 84 is in the same plane as the marginal portion 90 which is positioned at the lowermost position in the inner circumferential surface of the case 24 and adjacent to the opening 28. However, the present invention is not limited in this respect. For example, the outer marginal portion 88 which is positioned at the uppermost position in the bottom surface 86 may be lower than the marginal portion 90 which is positioned at the lowermost position in the inner circumferential surface of the case 24 and adjacent to the opening 28.

Further, although the embodiment for carrying out the above invention has been described in connection with the case where so called the normal close type automatic drain discharge apparatus 20 is adopted, the present invention may be applicable to the normal open type automatic drain discharge apparatus.

Further, although the embodiment for carrying out the above invention has been described in connection with the case where one drain inlet hole 34 is formed on the upper surface of the lid member 22, the present invention is not limited in this respect. For example, the present invention may be applicable to other quality regulating devices (e.g., filter of so called the FRL unit, etc.) in fluid pressure devices.

The present invention is not limited to the above described embodiments. It is a matter of course that various modifications may be made without deviating from the gist of the present invention.

What is claimed is:

1. An automatic drain discharge apparatus comprising:
a case including an opening at a bottom of the case;
a first housing provided in the opening, and including a drain discharge hole;
a drain valve seat provided in the drain discharge hole;
a drain valve plug configured to open/close the drain valve seat; a float movable vertically in accordance with a liquid level of drain in the case; and
a pilot valve configured to apply pilot pressure to a diaphragm by vertical movement of the float in order to drive the drain valve plug,
wherein an inner diameter at the bottom of the case is gradually decreased from upper to lower positions;
the first housing includes a communication hole configured to allow an inside of the case to communicate with the drain discharge hole;
a bottom surface of the communication hole includes an inclined surface inclined toward the drain discharge hole; and
the bottom surface of the communication hole and an inner circumferential surface of the case form a continuous surface, or an uppermost position in the bottom surface of the communication hole is lower than a lowermost position in the inner circumferential surface of the case and adjacent to the opening.

2. The automatic drain discharge apparatus according to claim 1, wherein
the drain valve plug is a poppet type valve plug which is configured to open/close the drain valve seat from below.

3. The automatic drain discharge apparatus according to claim 1, wherein a second housing is provided above the first housing;
the first housing is configured to contain the drain valve plug, the drain valve seat, and the diaphragm; and
the second housing includes a base fitted to an upper portion of the first housing, and a cylindrical guide provided at a center of an upper surface the base, the cylindrical guide being inserted into the float; and
the float is positioned above the base of the second housing.

4. The automatic drain discharge apparatus according to claim 3, wherein the pilot valve includes a seat provided at an upper end of the cylindrical guide, a pilot valve plug configured to open/close the seat, and a lever coupled to the pilot valve plug; and
the float includes a flange part at an upper end of a marginal portion of the float, the flange part having a diameter expanded in a radial direction; and
when the float is displaced upward in accordance with an increased liquid level of the drain, the flange part pushes up the lever to open the seat.

5. The automatic drain discharge apparatus according to claim 1, wherein the first housing includes an engagement hole opened with inclination in a circumferential direction; and
a drain guide guided by the inclination of the engagement hole to move back and forth in an axial direction of the drain discharge hole.

* * * * *